(12) United States Patent
Marx et al.

(10) Patent No.: US 9,199,323 B2
(45) Date of Patent: Dec. 1, 2015

(54) SEMI-COMPLETING SKIVING METHOD AND DEVICE HAVING CORRESPONDING SKIVING TOOL FOR EXECUTING A SEMI-COMPLETING SKIVING METHOD

(75) Inventors: Hartmut Marx, Düsseldorf (DE); Olaf Vogel, Ettlingen (DE)

(73) Assignee: KLINGELNBERG AG (CH)

( * ) Notice: Subject to any disclaimer, the term of this patent is extended or adjusted under 35 U.S.C. 154(b) by 712 days.

(21) Appl. No.: 13/617,277

(22) Filed: Sep. 14, 2012

(65) Prior Publication Data
US 2013/0071197 A1    Mar. 21, 2013

(30) Foreign Application Priority Data

Sep. 15, 2011   (EP) .................................. 11 181 521

(51) Int. Cl.
    *B23F 5/16*     (2006.01)
    *B23F 17/00*     (2006.01)

(52) U.S. Cl.
    CPC ................ *B23F 5/163* (2013.01); *B23F 17/006* (2013.01); *Y10T 409/10795* (2015.01); *Y10T 409/101431* (2015.01); *Y10T 409/103816* (2015.01); *Y10T 409/103975* (2015.01); *Y10T 409/105088* (2015.01); *Y10T 409/105724* (2015.01)

(58) Field of Classification Search
    CPC ........... Y10T 409/101431; Y10T 409/103816; Y10T 409/103975; Y10T 409/10477; Y10T 409/105088; Y10T 409/105247; Y10T 409/105565; Y10T 409/105724; Y10T 409/107632; Y10T 409/107791; Y10T 409/10795; Y10T 409/108109; Y10T 409/108268; B23F 5/16; B23F 5/163; B23F 17/006
    USPC ........... 409/10, 25, 26, 31, 33, 34, 36, 37, 49, 409/50, 51, 52, 53
    See application file for complete search history.

(56) References Cited

U.S. PATENT DOCUMENTS

| | | | | |
|---|---|---|---|---|
| 2,091,575 A | * | 8/1937 | Wildhaber | 409/26 |
| 2,310,484 A | * | 2/1943 | Wildhaber | 409/26 |
| 2,342,232 A | * | 2/1944 | Wildhaber | 409/26 |
| 2002/0192044 A1 | * | 12/2002 | Simon et al. | 409/26 |

FOREIGN PATENT DOCUMENTS

| | | |
|---|---|---|
| DE | 243 514 | 3/1910 |
| DE | 39 15 976 A1 | 11/1990 |
| EP | 2 520 391 A1 | 11/2012 |
| EP | 2 527 072 A1 | 11/2012 |

* cited by examiner

*Primary Examiner* — Sunil K Singh
*Assistant Examiner* — Michael Vitale
(74) *Attorney, Agent, or Firm* — McCarter & English, LLP

(57) ABSTRACT

Apparatus and method for skiving first and second work pieces using the same skiving tool to machine both work pieces. Flank cutting edges of the skiving tool subjected to a stronger load during machining of the first work piece are subjected to a lesser load during machining of the second work piece and vice versa. Accordingly, a substantially uniform load is subjected to both flank cutting edges overall, resulting in improved uniformity of wear to both flank cutting edges.

12 Claims, 14 Drawing Sheets

SEMI-COMPLETING SKIVING METHOD AND DEVICE HAVING CORRESPONDING SKIVING TOOL FOR EXECUTING A SEMI-COMPLETING SKIVING METHOD

CROSS-REFERENCE TO RELATED APPLICATIONS

This application claims priority under 35 U.S.C. §119(a)-(d) to European Patent Application No. EP 11 181 521.3, filed Sep. 15, 2011, which is hereby incorporated by reference in its entirety as part of the present disclosure as if fully set forth herein.

FIELD OF THE INVENTION

The object of the invention is a method for semi-completing skiving of gear teeth or another periodic structure and a device having a corresponding skiving tool for executing a semi-completing skiving method.

BACKGROUND OF THE INVENTION

There are numerous methods for manufacturing gear wheels. In soft preliminary machining one distinguishes hobbing, gear shaping, generating planing, and power skiving. Hobbing and skiving are so-called continuous methods, as explained in greater detail hereafter.

In cutting gear wheels, one differentiates between the intermittent indexing method or single indexing method and the continuous method, sometimes also designated as the continuous indexing method or face hobbing.

In the continuous method, for example, a tool having corresponding cutters is used to cut the flanks of a work piece. The work piece is finish cut continuously in a chuck, i.e., in an uninterrupted method. The continuous method is based on complex, coupled movement sequences, in which the tool and the work piece to be machined execute a continuous indexing movement relative to one another. The indexing movement results from the coordinated or coupled driving, respectively, of multiple axis drives of a corresponding machine.

In the single indexing method, one tooth gap is machined, then, for example, a relative movement of the tool and a so-called indexing movement (indexing rotation) occur, during which the work piece rotates relative to the tool before the next tooth gap is then machined. A gear wheel is thus manufactured step-by-step.

The gear shaping method mentioned at the beginning can be described or represented by a cylinder wheel gear, since the intersection angle (also called axis intersection angle) between the rotational axis R1 of the shaping tool 1 and the rotational axis R2 of the work piece 2 is zero degrees, as schematically shown in FIG. 1. The two rotational axes R1 and R2 extend in parallel if the axis intersection angle is zero degrees. The work piece 2 and the shaping tool 1 continuously rotate around their rotational axes R2 or R1, respectively. The shaping tool 1 performs a stroke movement in addition to the rotational movement, which is indicated in FIG. 1 by the double arrow $S_{hx}$, and removes chips from the work piece 2 during this stroke movement.

Some time ago, a method which is designated as skiving was taken up again. The fundamentals are approximately 100 years old. A first patent application having the number DE 243514 on this subject dates back to the year 1912. After the original considerations and studies of the initial years, skiving was no longer seriously pursued further. This is because complex processes, which were partially empirical, were necessary to find a suitable tool geometry for the skiving method.

About in the middle of the nineteen-eighties, skiving was taken up again. The principle of skiving could first be implemented in a productive, reproducible, and robust method with current simulation methods and modern CNC controllers of the machines. In addition, the high wear resistance of current tool materials, the enormously high static and dynamic stiffness, and the high quality of the synchronized running of the modern machines were significant.

As shown in FIG. 2A, in skiving, an axis intersection angle $\Sigma$ between the rotational axis R1 of the skiving tool 10 (also designated as the skiving wheel) and the rotational axis R2 of the work piece 20 is predefined, which is not equal to zero. The resulting relative movement between the skiving tool 10 and the work piece 20 is a helical movement, which can be decomposed into a rotary component (rotational component) and an advance component (translational component). A rolling helical gearing can be considered to be a drive-technology analogue, the rotary component corresponding to the rolling and the advance component corresponding to the sliding of the flanks. The greater the absolute valve of the axis intersection angle $\Sigma$, the more the translational movement component required for the machining of the work piece 20 increases. This is because it causes a movement component of the blades of the skiving tool 10 in the direction of the tooth flanks of the work piece 20. In skiving, the sliding component of the meshing relative movement of the engaged gear wheels of the equivalent helical gearing is utilized to execute the cutting movement. In skiving, only a slow axial feed $s_{ax}$ (also called axial feed) parallel to the rotational axis R2 of the work piece 20 is required and therefore the so-called shaping movement, which is typical for gear shaping, is omitted. Also, no return stroke movement therefore occurs in skiving.

The cutting velocity in skiving is directly influenced by the speed of the skiving tool 10 or the work piece 20 and by the employed axis intersection angle $\Sigma$ of the rotational axes R1 and R2. The axis intersection angle $\Sigma$, and therefore the sliding component, are to be selected so that an optimum cutting velocity is achieved for the machining of the material at a given speed.

The movement sequences and further details of a previously known skiving method can be inferred from the above-mentioned schematic illustration in FIG. 2A. FIG. 2A shows the skiving of external gear teeth on a cylindrical work piece 20. The work piece 20 and the tool 10 (a cylindrical skiving tool 10 here) rotate in opposite directions, as can be seen in FIG. 2A, e.g., on the basis of the angular velocities $\omega_1$ and $\omega_2$.

In addition, there are further relative movements. The above-mentioned axial feed $s_{ax}$ is required to be able to machine the entire gear teeth width of the work piece 20 using the tool 10. The axial feed causes a displacement of the tool 10 in relation to the work piece 20 in the parallel direction to the rotational axis R2 of the work piece 20. The direction of this movement of the tool 10 is identified in FIG. 2A by $s_{ax}$. If helical gear teeth are desired on the work piece 20 (i.e., $\beta_2 \neq 0$), a differential feed $s_D$ is overlaid on the axial feed $s_{ax}$, which, as indicated in FIG. 2A, corresponds to an additional rotation of the work piece 20 around its rotational axis R2. The differential feed $s_D$ and the axial feed $s_{ax}$ are adapted to one another at the design point such that the resulting feed of the tool 10 in relation to the work piece 20 occurs in the direction of the tooth gap to be generated. In addition, a radial feed $s_{rad}$ can be used to influence the crowning of the gear teeth of the work piece 20.

In skiving, the vector of the cutting velocity $\vec{v}_c$ results substantially as the difference of the two velocity vectors $\vec{v}_1$ and $\vec{v}_2$ of the rotational axes R1, R2 of tool 10 and work piece 20, which are inclined to one another by the axis intersection angle Σ. $\vec{v}_1$ is the velocity vector at the periphery of the tool 10 and $\vec{v}_2$ is the velocity vector at the periphery of the work piece 20. The cutting velocity $v_c$ of the skiving process can be changed by the axis intersection angle Σ and the speed in the equivalent helical gearing. The axial feed $s_{ax}$, which is relatively slow as already mentioned, only has a small influence on the cutting velocity $v_c$, in the skiving method, which can be neglected. The axial feed $s_{ax}$ is therefore not taken into consideration in the vector diagram having the vectors $\vec{v}_1$, $\vec{v}_2$, and $\vec{v}_c$ in FIG. 2A.

FIG. 2B shows the skiving of external gear teeth of a work piece 20 using a conical skiving tool 10. FIG. 2B again shows the axis intersection angle Σ, the vector of the cutting velocity $\vec{v}_c$, the velocity vectors $\vec{v}_1$ on the periphery of the tool 10 and $\vec{v}_2$ on the periphery of the work piece 20, and the helix angle $\beta_1$ of the tool 10 and the helix angle $\beta_2$ of the work piece 20. The helix angle $\beta_2$ is not equal to zero here. The tooth head of the tool 10 is identified in FIG. 2B by the reference sign 4. The tooth face is identified in FIG. 2B by the reference sign 5. The two rotational axes R1 and R2 do not intersect, but rather are arranged skewed to one another. With a conical skiving tool 10, the design point AP is typically selected on the common perpendicular of the two rotational axes R1 and R2, since tilting of the skiving tool 10 is not necessary to provide clearance angles. The design point AP is coincident here with the so-called contact point BP. The pitch circles of the equivalent helical rolling gearing touch at this design point AP.

A tool 10 is used in skiving, which comprises at least one geometrically defined flank cutting edge. The flank cutting edge(s) are not shown in FIG. 2A and FIG. 2B. The shape and arrangement of the flank cutting edges are among the aspects which must be taken into consideration in practice in a concrete design.

In addition, the tool itself has great significance in skiving. The skiving tool 10 has the shape of a straight-toothed spur gear in the example shown in FIG. 2A. The outer contour of the main body in FIG. 2A is cylindrical. However, it can also be cone-shaped (also called conical), as shown in FIG. 2B. Since the gear tooth or gear teeth of the skiving tool 10 engage over the entire length of the flank cutting edge, each gear tooth of the tool 10 requires a sufficient clearance angle at the flank cutting edge.

It is known that a so-called semi-completing approach can be followed in skiving. An approach is designated as a semi-completing method, in which both right and also left flanks of tooth gaps are machined in a first step, but only the geometries of the right or left flanks are finish machined. Then, in a second step, after the machine setting has been changed, one of the two flanks is reworked to obtain the desired gap width and tooth geometry. One reason for the application of a semi-completing method is that the flanks can be designed more freely, i.e., so-called flank modifications are more easily possible than in the completing method. In addition, the tooth thickness can also be corrected via the semi-completing approach, in that the gap width is changed by a simple pivot of the work wheel.

The semi-completing method is originally known for bevel gears from grinding in the single indexing method of gear teeth which are premilled in the Zyklo-Palloid® method.

Several studies of previous skiving methods have shown that, depending on the design of the skiving tools 10, significant wear of the skiving tool 10 can occur. The statement also applies for the application of the semi-completing approach to skiving. Therefore, solutions are sought which allow the wear of the skiving tools 10 to be reduced, or the service life of the skiving tools 10 to be improved, respectively. The skiving method becomes more cost-effective through reduced wear, since the production costs during the gear cutting of work pieces 20 are substantially influenced by the tool service lives.

SUMMARY OF THE INVENTION

It is an object of the present invention is to provide a method and a device for machining the tooth flanks of a gear wheel or other periodic structures, which is distinguished by a reduction of the production costs per gear wheel or work piece. It is another object of the invention to provide the longest possible tool service life.

These objects are achieved by a method, which is designated here as an alternating semi-completing skiving method, i.e., the object is achieved according to the present invention by a method which is based on the principle of the semi-completing method. In order to achieve the most uniform possible load and therefore wear of the flank cutting edges and optionally also the head cutting edges of the skiving tool, an alternating approach can be implemented.

During manufacturing of, for example, gear teeth, the two flanks are skived using different settings, but using the same tool, continuously with the application of an alternating semi-completing approach. It is in the nature of the semi-completing approach that, e.g., all left flank cutting edges of the tool are used two times, while the right flank cutting edges are only used one time. Therefore, the same tool is used to manufacture gear teeth in such a manner that the flank cutting edges that were previously subjected to a stronger and/or longer machining time (the left flank cutting edges in the mentioned example) are now used less strongly or frequently in subsequent steps. This is achieved because the other flank cutting edges (the right flank cutting edges in the mentioned example) are used more strongly or frequently during the manufacturing of the second gear teeth.

The invention can be used for preliminary gear cutting, i.e., machining in stock.

According to an aspect, in addition to the wear of the flank cutting edges, the wear on the head cutting edges can also be equalized or uniformly distributed. The invention thus relates to an alternating semi-completing skiving method, i.e., a method in which aspects of semi-completing are applied to a continuous skiving method with the load of the cutting teeth of the tool being distributed as uniformly as possible by alternating use of the flank cutting edges.

According to another aspect the alternating semi-completing skiving method may be used in conjunction with the production of rotationally-symmetric, periodic structures, such as gear teeth and the like.

According to another aspect, a tool, which is designated here as a skiving tool, is used in the alternating semi-completing skiving method.

Another aspect relates to a method and a device for skiving at least two work pieces having rotationally-symmetric, periodic structures while employing only one skiving tool. The following steps are executed:

providing a first work piece, approaching a first relative position of the skiving tool in relation to the first work piece, executing a first skiving machining action (also called first machining phase) of the first work piece, during the first skiving machining action, either all right or all left flanks of the periodic structure of the first work piece being finish machined and the respective other flanks being premachined, approaching a second relative position of the skiving tool in relation to the first work piece, executing a second skiving machining action (also called second machining phase) of the first work piece, during the second skiving machining action, those flanks of the periodic structure of the first work piece being finish machined, which were previously only premachined during the first skiving machining action, providing the second work piece, approaching a third relative position of the skiving tool in relation to the second work piece, executing a third skiving machining action (also called third machining phase) of the second work piece, during the third skiving machining action,
- either all right flanks of the periodic structure of the second work piece being finish machined and all left flanks being premachined, if all left flanks of the periodic structure were finish machined during the execution of the first skiving machining action on the first work piece,
- or all left flanks of the periodic structure of the second work piece being finish machined and all right flanks being premachined, if all right flanks of the periodic structure were finish machined during the execution of the first skiving machining action on the first work piece, approaching a fourth relative position of the skiving tool in relation to the second work piece, executing a fourth skiving machining action (also called fourth machining phase) of the second work piece, during the fourth skiving machining action, those flanks of the periodic structure of the second work piece being finish machined which were previously only premachined during the third skiving machining action.

It should be noted here that the third and fourth machining phases do not necessarily have to follow immediately after the first and second machining phases. For example, it is also possible that multiple work pieces are subjected to a first and second machining phase and then subsequently other work pieces are subjected to the third and fourth machining phases. Overall, however, through the alternation during the semi-completing machining, approximately an equal distribution of the load of the right flank cutting edges and left flank cutting edges of the skiving tool is achieved.

It should also be noted that for the sake of simplicity, work pieces having symmetrical teeth are shown and described hereafter. However, the invention may also be applied to asymmetrical structures. For example, the rotationally-symmetric periodic structures of the work piece do not necessarily have to have symmetrical teeth, or symmetrical tooth gaps, grooves, or channels.

It should also be noted here that at least the first and second relative positions and the third and fourth relative positions differ from one another. In some embodiments, at least two of the first, second, third and fourth relative positions differ from one another through an angle of rotation of the first work piece or the second work piece relative thereto. In some embodiments, the first relative position corresponds to the fourth relative position and the second relative position corresponds to the third relative position.

The head cutting edge has a width on the skiving tool which is smaller than the gap width at the tooth base of the (tooth) gaps to be manufactured on the first work piece and on the second work piece.

In addition, the wear of the head cutting blades can also be uniformly distributed, in that the width of the head cutting blades in relation to the gap width on the work piece is selected accordingly. In some embodiments, the head cutting blade has a width which is less than or equal to about ⅔ of the gap width at the tooth base.

It is characteristic in some aspects that the relative movement sequences (called relative movements) between work piece and tool are predefined and executed so that material is continuously removed on the work piece until the teeth or the other periodic structures are formed.

According to another aspect, a radial movement can be overlaid on the relative feed movement of the skiving tool in order to influence the crowning of the teeth, for example, according to the technical teaching of German Patent Application DE3915976 A1.

The method according to another aspect may be used on work pieces "without gear teeth", i.e., in the scope of the soft machining (called preliminary gear cutting) before the hardening.

The method according to another aspect may also be used for hard machining under certain circumstances.

During the skiving, the rotating tool executes an axial feed movement in relation to the rotating work piece in the direction of the second rotational axis, this axial feed movement extending in the same or opposite direction to the cutting direction.

According to another aspect, the rotational axis of the tool is placed skewed in relation to the rotational axis of the work piece in the skiving, i.e., the axis intersection angle $\Sigma$ is not equal to zero.

According to another aspect, the tool can be inclined in the direction toward or away from the work piece during the skiving, such as described, for example, in a parallel application of the present applicant, which was filed on 26 May 2011 under the application number EP11167703.5 with the European Patent Office.

The skiving according to another aspect is accomplished in a continuous, chip-removing method.

The tools according to another aspect can be designed as so-called complete tools, i.e., these are tools which are implemented substantially in one piece. In the complete tools, the cutting teeth are an integral component of the tool.

Cutter head tools (called bar cutter tools here) which have a disk-like, ring-like, or plate-like cutter head main body, which is equipped with cutter inserts, such as in the form of bar cutters, are utilized in some embodiments. Embodiments are also possible that are designed as cutting plate tools, which have a disk-like or plate-like cutter head main body, which is equipped with cutting plates.

According to another aspect, the shafts of the bar cutter tools can be implemented as narrower in comparison to other skiving tools. A higher packing density is thus possible. More bar cutter tools can also be housed on a disk-like, ring-like, or plate-like cutter head main body than in other semi-completing approaches.

The method of the invention can be applied not only with external tools, but also with internal tools.

The invention offers an array of advantages in relation to conventional semi-completing skiving, including:

longer service life of the tools;

lower work piece costs;
reduced tool failure;
better cost-effectiveness.

A method according to another aspect can be carried out both in conjunction with dry machining and also wet machining.

Further details and advantages of the invention are described hereafter on the basis of exemplary embodiments and with reference to the drawing. For the sake of simplicity, work piece and skiving tool are reduced to the situation at the pitch circle (or on the work piece on the pitch cylinder) in all schematic drawings. The illustrated relationships also apply for all of the gear teeth having a tooth height, however.

DETAILED DESCRIPTION OF EMBODIMENTS OF THE INVENTION

Terms are used in the context of the present description which are also used in relevant publications and patents. However, it is to be noted that the use of these terms is only to serve for better understanding. The ideas of the invention and the scope of protection of the patent claims are not to be restricted in their interpretation by the specific selection of the terms. The invention may be readily transferred to other term systems and/or technical fields. The terms are to be applied accordingly in other technical fields.

For example, rotationally-symmetric, periodic structures are gear wheels (such as spur gears) having internal or external gear teeth. However, for example, these can also be brake discs, clutch elements, or transmission elements and the like. In particular, this relates to the production of pinion shafts, worms, gear wheel pumps, ring joint hubs (ring joints are used, for example, in the motor vehicle sector to transmit the force from a differential to a vehicle wheel), spline shaft connections, sliding sleeves, belt pulleys, and the like. The periodic structures are also designated as periodically recurring structures here.

Primarily, gear wheels, teeth, and tooth gaps are discussed hereafter. However, the invention may also be used with other components having other periodic structures, as mentioned above. In such embodiments, these other components do not relate to tooth gaps, but rather to grooves or channels, for example.

First and second work pieces 50.1, 50.2, respectively, are discussed hereafter. The second work piece 50.2 typically does not differ from the work piece 50.1 in both prior to machining and in the finish-machined form. There is typically a difference between a work piece 50.1 after the first step, which is designated here as the first machining phase, and a second work piece 50.2 after the third step, which is designated here as the third machining phase.

Aspects of the machining methods are described hereafter with reference to the schematic illustrations in FIGS. 3A to 3D and FIGS. 4A to 4D.

Figure 1:
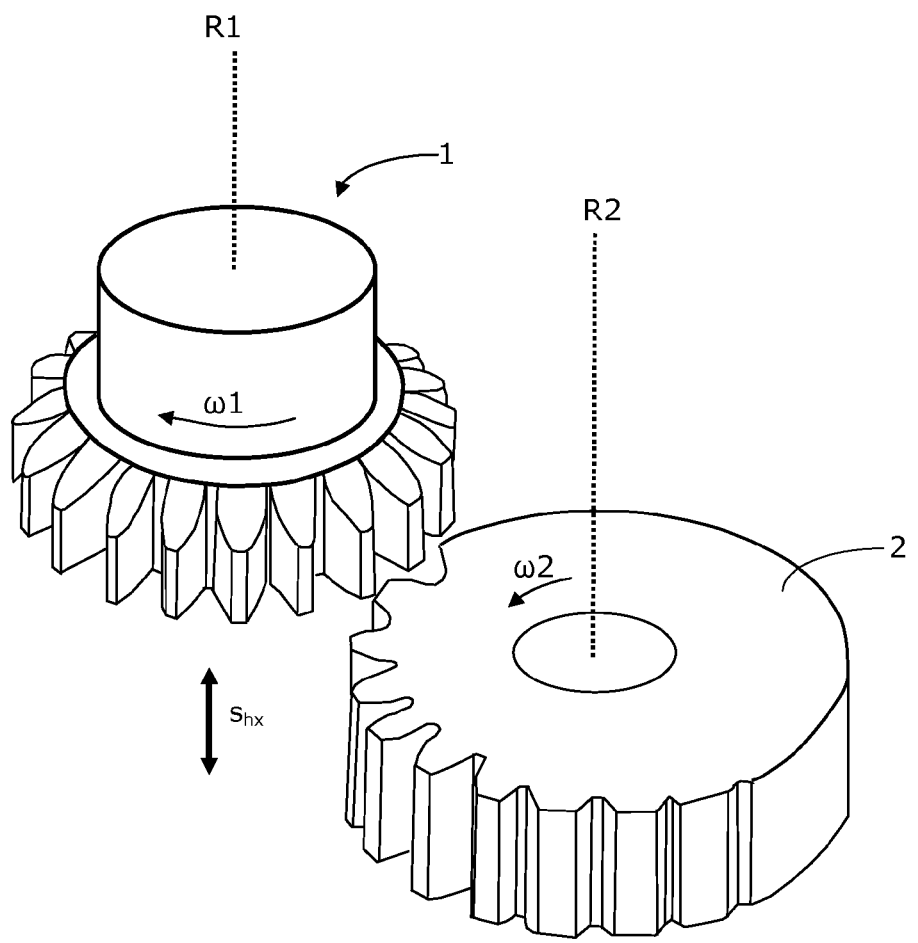
FIG. 1 shows a schematic illustration of a prior art shaping wheel having cylindrical outer contour in engagement with an externally-toothed work piece during gear shaping.
Figure 2A:
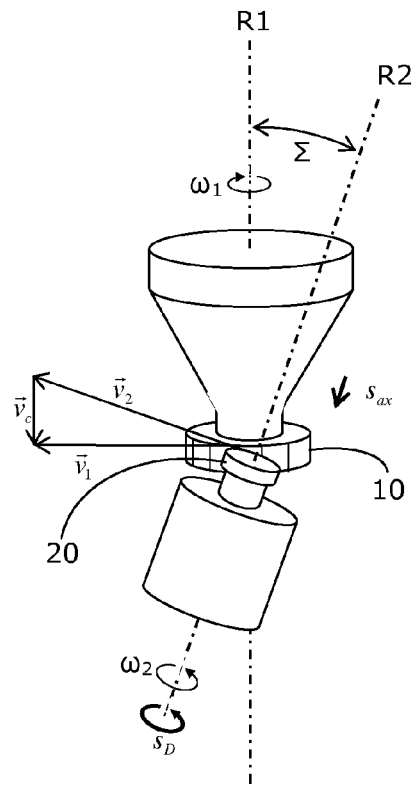
FIG. 2 shows a schematic illustration of a prior art straight-toothed skiving wheel having cylindrical outer contour in engagement with an externally-toothed work piece during skiving.
FIG. 2B shows a schematic illustration of a prior art helical-toothed skiving wheel having conical outer contour in engagement with an externally-toothed work piece during skiving.
Figure 2B:
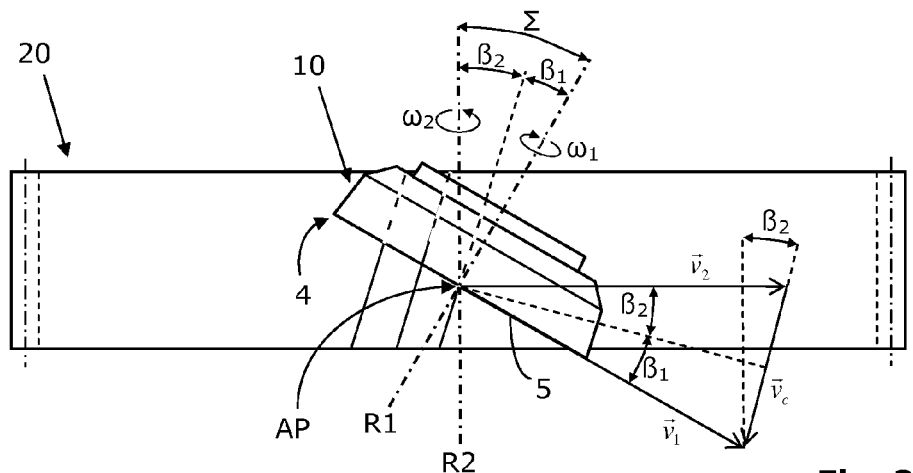
Figure 3A:
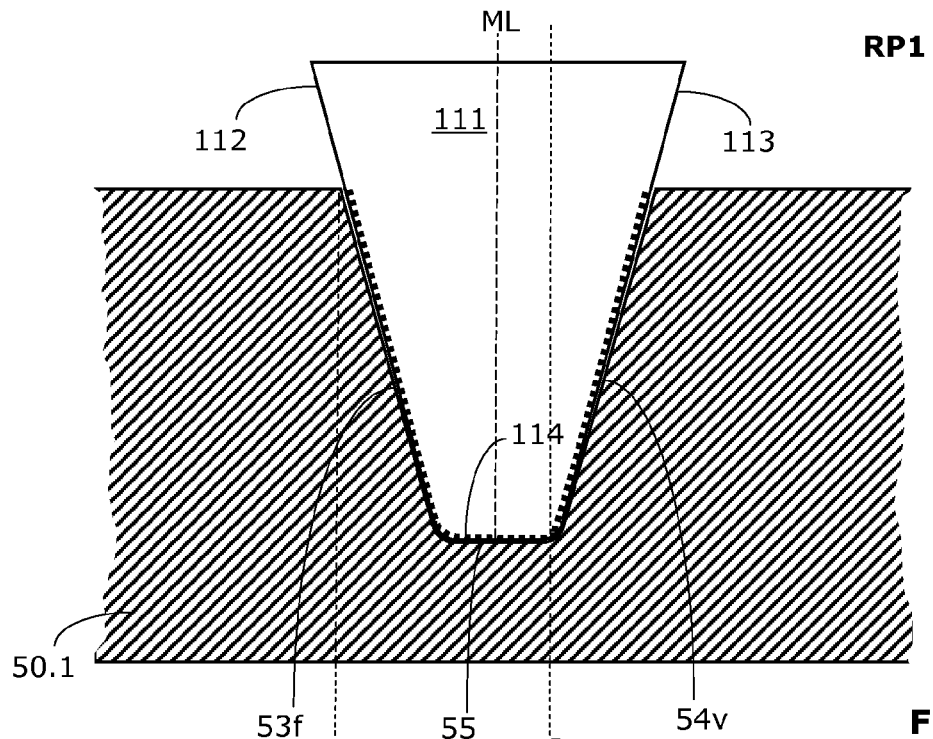
FIG. 3A shows a schematic sectional illustration of right and left flank cutting edges and the head cutting edge of a cutting tooth of a skiving tool cutting a first work piece during the first machining phase where the left flank of the work piece is finish gear cut and the right flank of the work piece is simultaneously preliminarily gear cut.
Figure 3B:
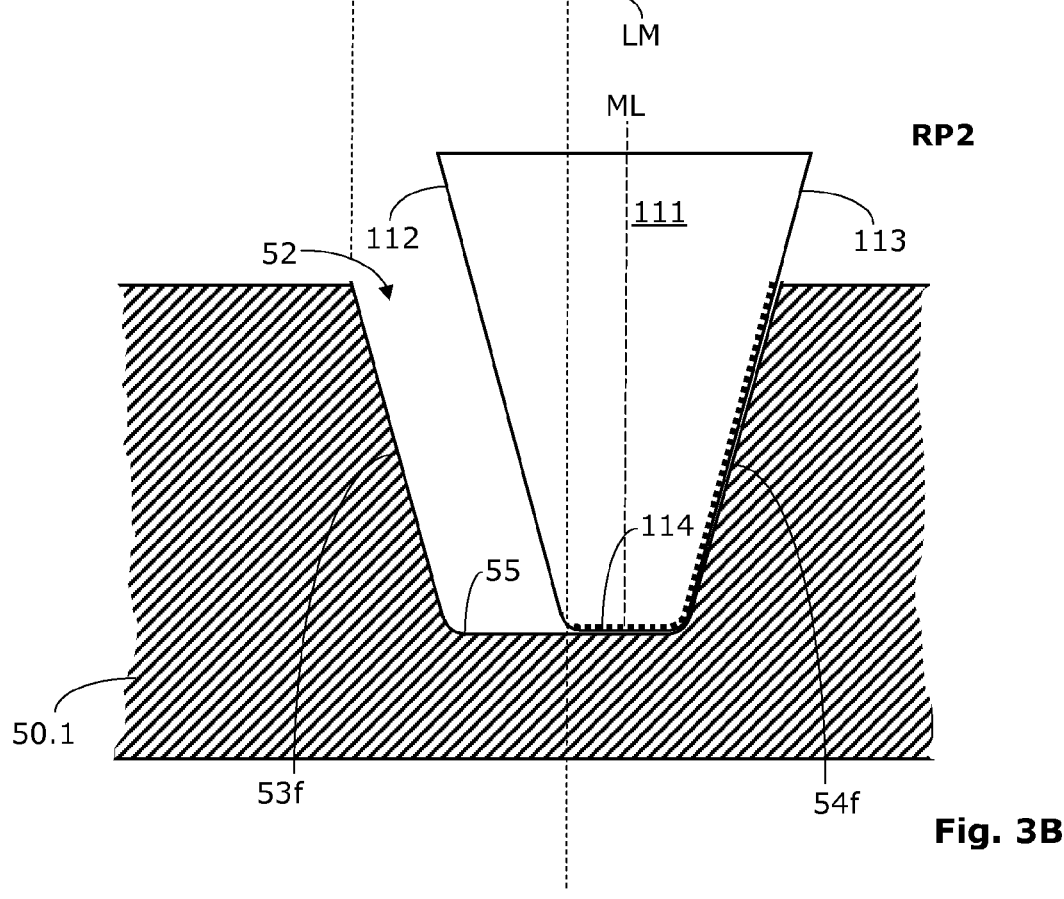
FIG. 3B shows a schematic sectional illustration of the skiving tool and first work piece of FIG. 3A during a second machining phase where the right flank cutting edge and the head cutting edge of a cutting tooth of the skiving tool finish gear cuts the right flank of the first work piece.

One method is described on the basis of FIGS. 3A to 3D, which primarily relates to a uniform load of all right flank cutting edges 113 and all left flank cutting edges 112 of a skiving tool 100. The use of the head cutting blade 114 of the skiving tool 100 was not subjected to optimization here. FIGS. 3A and 3B relate to the skiving of a first work piece 50.1 having a rotationally-symmetric, periodic structure with a skiving tool 100, and FIGS. 3C and 3D relate to the skiving of a second work piece 50.2 having a rotationally-symmetric, periodic structure with the same skiving tool 100. The figures are schematic and only show one tooth gap and one cutting tooth 111 of the skiving tool 100. The following lines are drawn as an aid to show the relative locations of the skiving tool 100 and work piece 50.1 in FIGS. 3A and 3B and the relative locations of the skiving tool 100 and work piece 50.2 in FIGS. 3C and 3D recognizable. ML represents the center line of the cutting tooth 111. The imaginary gap center is indicated by the line LM. A thick dotted line schematically shows those sections of the cutting tooth 111 which remove material on the work piece 50.1 or 50.2, respectively, at the moment shown. Although symmetrical structures are shown for the sake of simplicity in the drawings, the teeth or other periodic structures can also be asymmetrical.

The method shown in the Figures comprises the following steps:

Providing the first work piece 50.1. This step can comprise, for example, introducing the first work piece 50.1 into a skiving machine 200 and chucking the first work piece 50.1 on a work piece spindle 180.

A first relative position RP1 of the skiving tool 100 in relation to the first work piece 50.1 is now approached. The first relative position RP1 is indicated in FIG. 3A (the center line ML is seated to the left of the imaginary gap center LM here).

In the first relative position RP1, a first skiving machining action (called the first machining phase) of the first work piece 50.1 begins. During the first machining phase, either all right flanks 54 or all left flanks 53 of the periodic structure of the first work piece 50.1 are finish machined and the respective other flanks 53, 54 are premachined. An example is shown in FIG. 3A, in which the left flanks are finish machined during the first machining phase, as indicated by the reference sign 53*f* (f stands for finish). The right flanks, in contrast, are only premachined, as indicated by the reference sign 54*v* (v stands for premachined). All flank cutting edges 112, 113, and 114 are used in their entirety during the first machining phase.

A second relative position RP2 of the skiving tool 100 in relation to the first work piece 50.1 is now approached. The second relative position RP2 is indicated in FIG. 3B (the center line ML is seated to the right of the imaginary gap center LM here).

In the second relative position RP2, a second skiving machining action (called the second machining phase) of the first work piece 50.1 begins. During the second machining phase, those flanks 53, 54 of the periodic structure of the first work piece 50.1 are finish machined which were previously only premachined during the first machining phase. In the example shown, the right flanks are finish machined during the second machining phase, as indicated by the reference sign 54*f* (f stands for finish). During the second machining phase, all right flank cutting edges 113 and the complete head cutting edges 114 are used. The left flank cutting edges 112 are not used here.

Following the machining of the first work piece 50.1, or after further first work pieces have been machined (according to the same method scheme), the second work piece 50.2 is provided. This step can comprise, for example, introducing the second work piece 50.2 into a skiving machine 200 and chucking the second work piece 50.2 on a work piece spindle 180. It is also possible to equip a skiving machine 200 with two work piece spindles 180, in order to allow the change from machining the first work piece 50.1 to machining the second work piece 50.2 without re-chucking.

A third relative position RP3 of the skiving tool 100 in relation to the second work piece 50.2 is now approached. The center line ML is seated to the right of the imaginary gap center LM here, as in the second relative position RP2.

In the third relative position RP3 (which can correspond, e.g., to the second relative position RP2), a third skiving machining action (called the third machining phase) of the second work piece 50.2 begins. During the third machining phase
either all right flanks 54 of the periodic structure of the second work piece 50.2 are finish machined and all left flanks 53 are premachined (as shown in FIG. 3C), if all left flanks 53 of the periodic structure were finish machined during the execution of the first skiving machining action on the first work piece 50.1 (as is the case in FIG. 3A); or Alternatively, all left flanks 53 of the periodic structure of the second work piece 50.2 are finish machined and all right flanks 54 are premachined, if all right flanks 54 of the periodic structure were finish machined during the execution of the first skiving machining action on the first work piece 50.1.

Figure 3C:
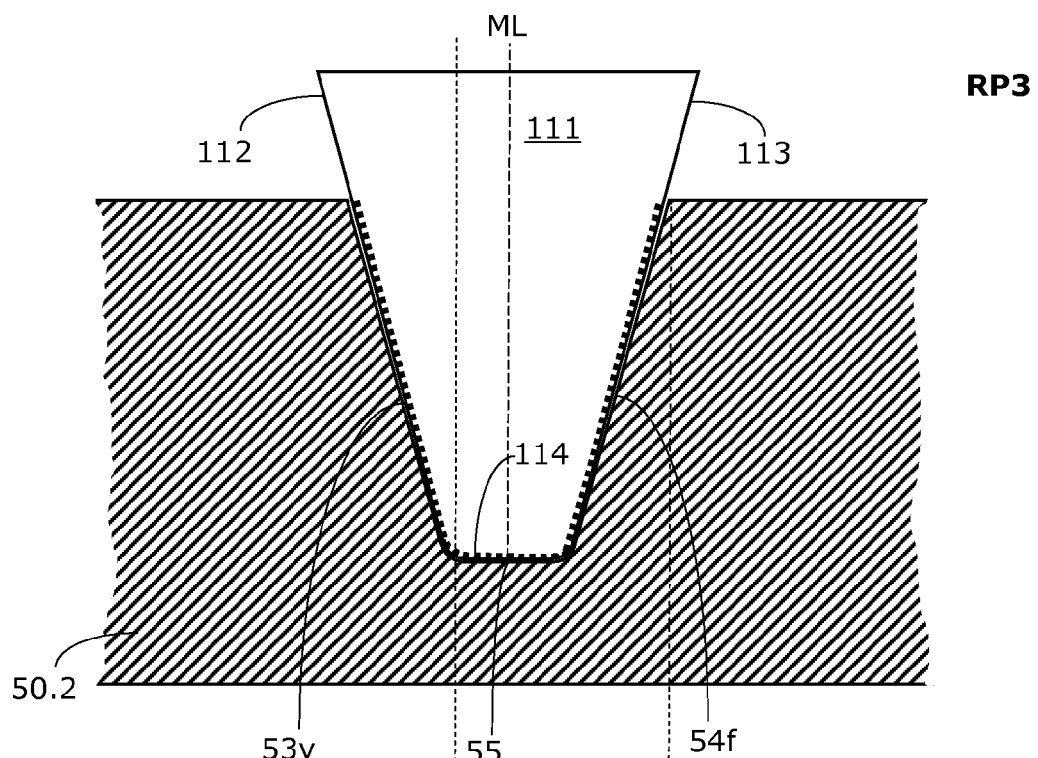
FIG. 3C shows a schematic sectional illustration of the skiving tool of FIG. 3A and a second work piece during a third machining phase where the right and left flank cutting edges and the head cutting edge of a cutting tooth of the skiving tool finish gear cut a right flank of the second work piece and the left flank is simultaneously preliminarily gear cut.
Figure 3D:
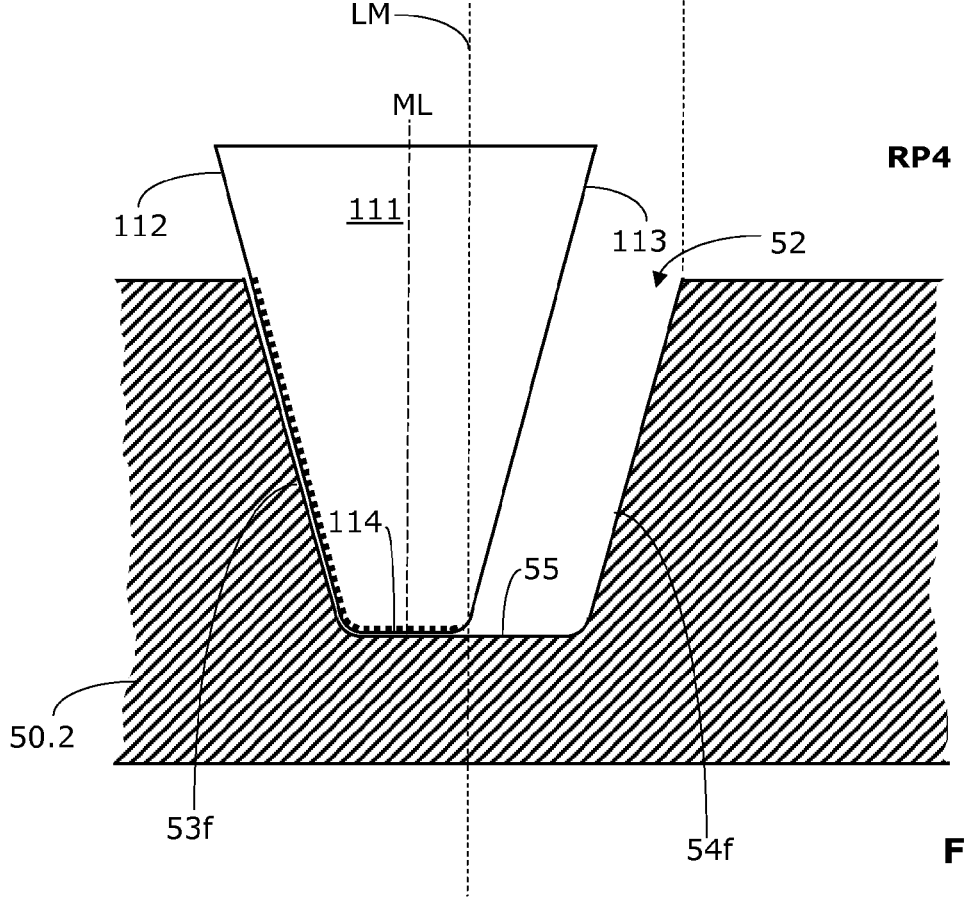
FIG. 3D shows a schematic sectional illustration of the skiving tool and second work of FIG. 3C piece during a fourth machining phase where the left flank cutting edge and the head cutting edge of a cutting tooth of the skiving tool finish gear cuts the left flank of the second work piece.

In the example shown in FIGS. 3A to 3D, all left flanks of the periodic structure were finish machined on the first work piece 50.1 during the first machining phase, as indicated by the reference sign 53*f* (f stands for finish) in FIG. 3A. Therefore, during the third machining phase (shown in FIG. 3C), all right flanks of the periodic structure of the second work piece 50.2 were finish machined, as indicated in FIG. 3C by the reference sign 54*f* (f stands for finish). The left flanks were only premachined, as indicated in FIG. 3C by the reference signs 53*v* (v stands for premachined). All flank cutting edges 112, 113, and 114 are again used in their entirety during the third machining phase.

A fourth relative position RP4 of the skiving tool 100 in relation to the second work piece 50.2 is now approached. The fourth relative position RP4 is identical in the example shown to the first machining position RP1, which is obvious on the basis of a comparison of FIGS. 3A and 3D. The center line ML is seated to the left of the imaginary gap center LM here, as in the first relative position RP1.

In the fourth relative position RP4, a fourth skiving machining action (called the fourth machining phase) of the second work piece 50.2 begins. During the fourth machining phase, those flanks 53, 54 of the periodic structure of the second work piece 50.2 are finish machined which were previously only premachined during the third machining phase. In the example shown, the left flanks are finish machined, as indicated by the reference sign 53$f$ (f stands for finish) in FIG. 3D. All left flank cutting edges 112 and the entire head cutting edges 114 are used during the fourth machining phase. The right flank cutting edges 113 are not used here.

Overall, during the manufacturing of a first work piece 50.1 and a second work piece 50.2 according to FIGS. 3A to 3D, the left flank cutting edges 112 are used three times, the right flank cutting edges 113 are used three times, and the head cutting edge is used four times per tooth gap 52, cut by one cutter. The flank cutting edges 112, 113 are therefore uniformly loaded.

Furthermore, it can be seen in FIGS. 3A to 3D that a right flank cutting edge 113, a left flank cutting edge 112, and a head cutting edge 114 are provided on the cutting tooth 111. In the example shown, the head cutting edge 114 has a width (in the plane of the drawing) which approximately corresponds to half of the base width of the tooth base 55 of the tooth gap 52 to be manufactured. This dimensioning has the result that the head cutting edge 114 is used two times during the machining of the first work piece 50.1, specifically during the first machining phase (FIG. 3A) and the second machining phase (FIG. 3B). In the second work piece 50.2, the head cutting edge 114 is accordingly also used two times. In contrast, if the width of the head cutting edge 114 is made greater than half of the base width of the tooth gap 52 to be manufactured, only a part of the head cutting edge 114 is used multiple times, as described hereafter on the basis of FIGS. 4A to 4D.

Figure 4A:
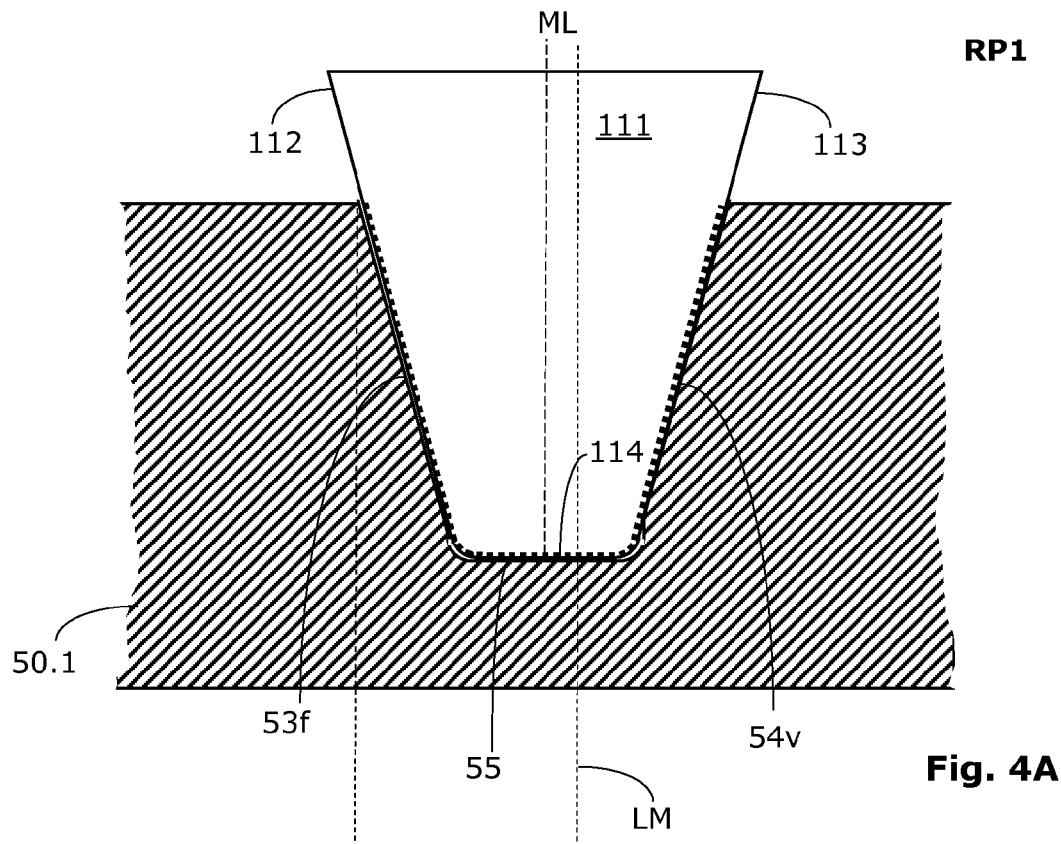
FIG. 4A shows a schematic sectional illustration of another embodiment where right and left flank cutting edges and the complete head cutting edge of a cutting tooth of a skiving tool cut a first work piece during the first machining phase where the left flank of the work piece is finish gear cut and the right flank of the work piece is simultaneously preliminarily gear cut.
Figure 4B:
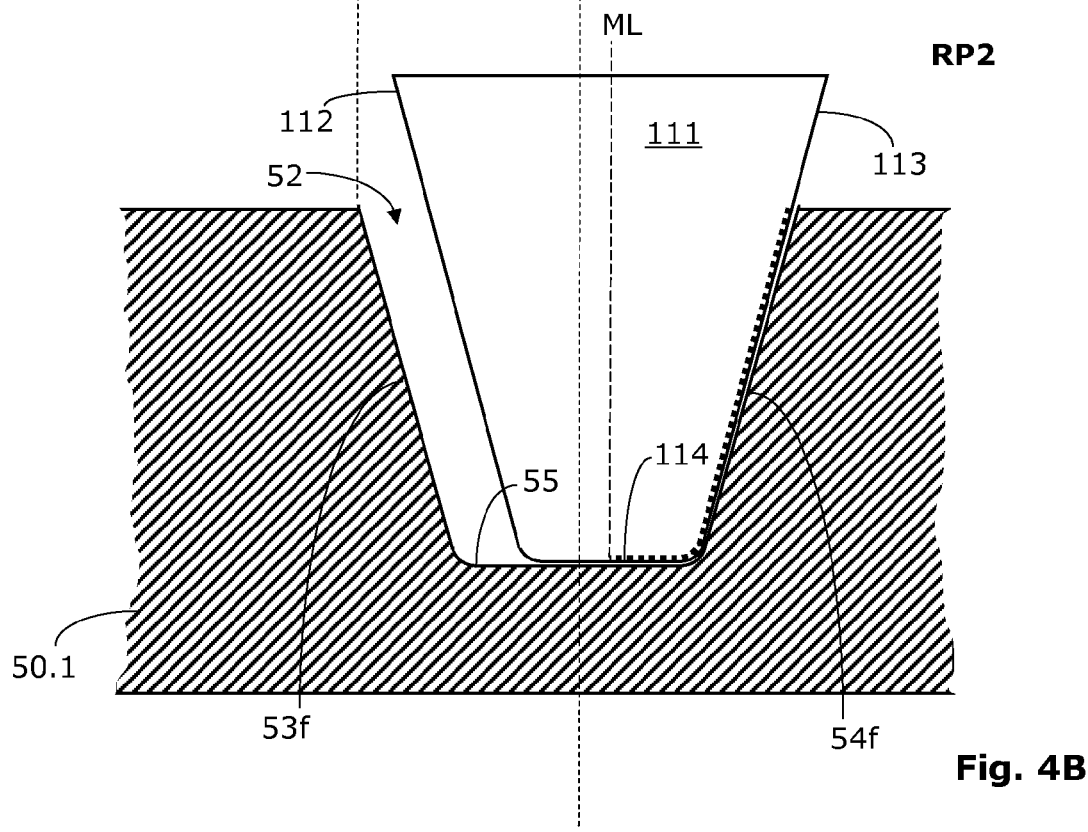
FIG. 4B shows a schematic sectional illustration of the skiving tool and first work piece of FIG. 4A during a second machining phase where the right flank cutting edge and the head cutting edge of a cutting tooth of the skiving tool finish gear cuts the right flank of the first work piece.

Another method will be described on the basis of FIGS. 4A to 4D, which also provides a uniform load of all right flank cutting edges 113 and all left flank cutting edges 112 of a skiving tool 100. Here, the use of the head cutting edge 114 of the skiving tool 100 was subjected to an optimization. FIGS. 4A and 4B also relate to the skiving of a first work piece 50.1 having a rotationally-symmetric, periodic structure with a skiving tool 100, and FIGS. 4C and 4D relate to the skiving of a second work piece 50.2 having a rotationally-symmetric, periodic structure with the same skiving tool 100.

Since FIGS. 4A to 4D substantially correspond to FIGS. 3A to 3D, reference is made to the description of FIGS. 3A to 3D, with the differences discussed hereafter. It can be seen on the basis of FIG. 4B and 4D that the head cutting edge 114 has a width which corresponds to approximately ⅔ of the gap width at the tooth base 55.

In the first machining phase, which is shown in FIG. 4A, all flank cutting edges 112, 113 and the entire head cutting edge 114 are used, as can also be recognized here on the basis of a thick, dotted line. In FIG. 4A, the left flank 53$f$ is finish machined and the right flank 54$v$ is premachined. In addition, the tooth base was machined over the entire width of the head cutting edge 114.

In FIG. 4B, the right flank 54$f$ is finish machined during the second machining phase. In addition, approximately the right third of the gap width at the tooth base 55 is finish machined. In the second machining phase, which is shown in FIG. 4B,
only the right flank cutting edges 113 and at most the right half of the head cutting edge 114 are used, as can also be recognized here on the basis of a thick, dotted line.

Figure 4C:
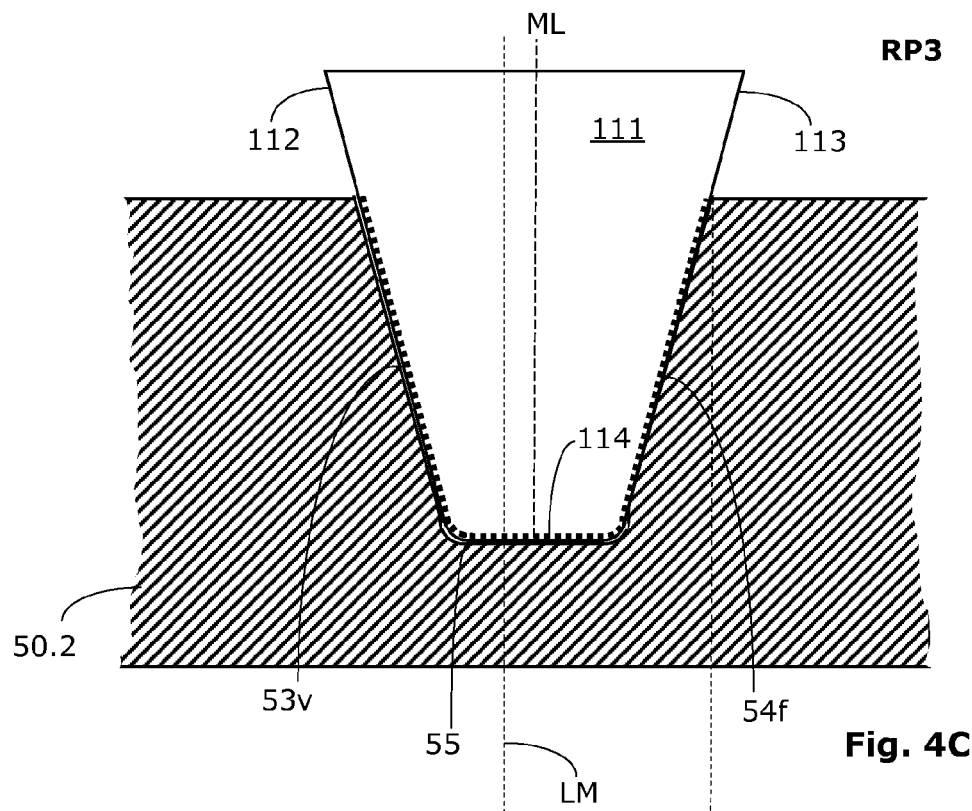
FIG. 4C shows a schematic sectional illustration of the skiving tool of FIG. 4A and a second work piece during a third machining phase where the right and left flank cutting edges and the complete head cutting edge of a cutting tooth of the skiving tool finish gear cut a right flank of the second work piece and the left flank is simultaneously preliminarily gear cut.

In the third machining phase, which is shown in FIG. 4C, all flank cutting edges 112, 113 and the entire head cutting edge 114 are again used, as can be recognized on the basis of a thick, dotted line. In FIG. 4C, the right flank 54$f$ is finish machined and the left flank 53$v$ is premachined. In addition, the tooth base was machined over the entire width of the head cutting edge 114.

Figure 4D:
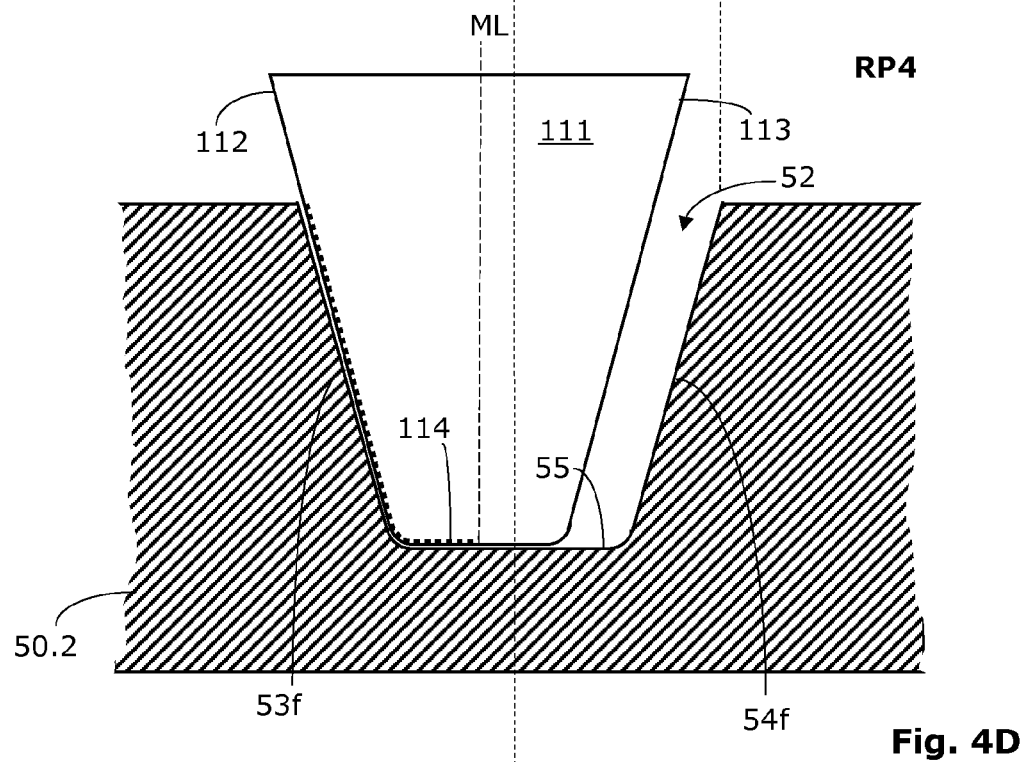
FIG. 4D shows a schematic sectional illustration of the skiving tool and second work of FIG. 4C piece during a fourth machining phase where the left flank cutting edge and the head cutting edge of a cutting tooth of the skiving tool finish gear cuts the left flank of the second work piece.

In FIG. 4D, the left flank 53$f$ is finish machined during the fourth machining phase. In addition, approximately the left third of the gap width at the tooth base 55 is finish machined. In the fourth machining phase, which is shown in FIG. 4D, only the left flank cutting edge 112 and at most the left half of the head cutting edge 114 are used, as can also be recognized here on the basis of a thick, dotted line.

Overall, during the manufacturing of a first work piece 50.1 and a second work piece 50.2 according to FIGS. 4A to 4D, the left flank cutting edges 112 are used three times, the right flank cutting edges 113 are used three times, and the head cutting edge 114 is used three times per tooth gap 52 cut by this cutter. The flank cutting edges 112, 113 and the head cutting edge 114 are therefore uniformly loaded.

The cutting tooth 111 can be part of a skiving tool 100 implemented as a complete tool, bar cutter tool, or cutting plate tool.

Figure 5A:
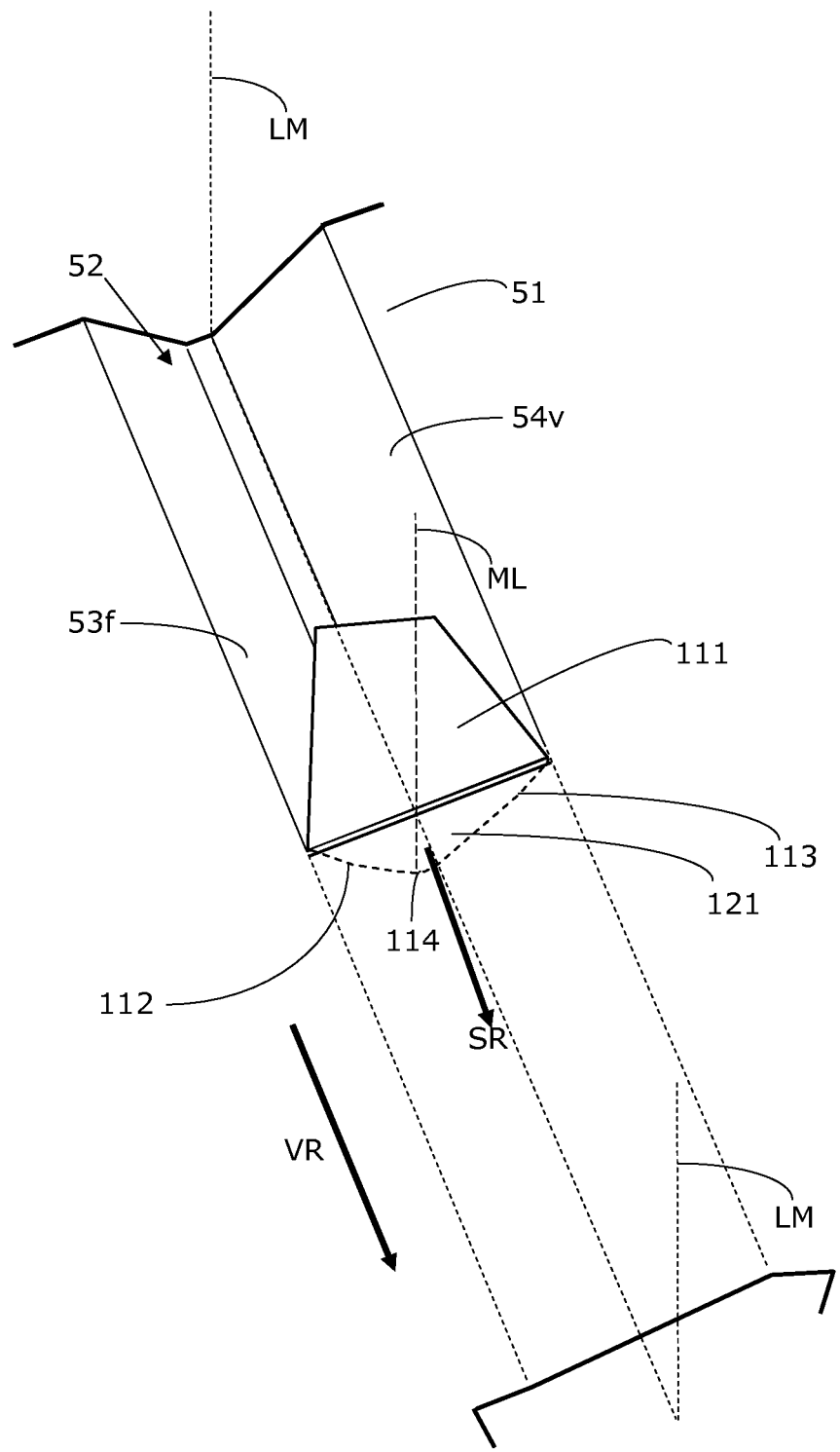
FIG. 5A shows a schematic top view illustrating the position of a cutting tooth relative to a work piece as it passes through a tooth gap during the first machining phase.
Figure 5B:
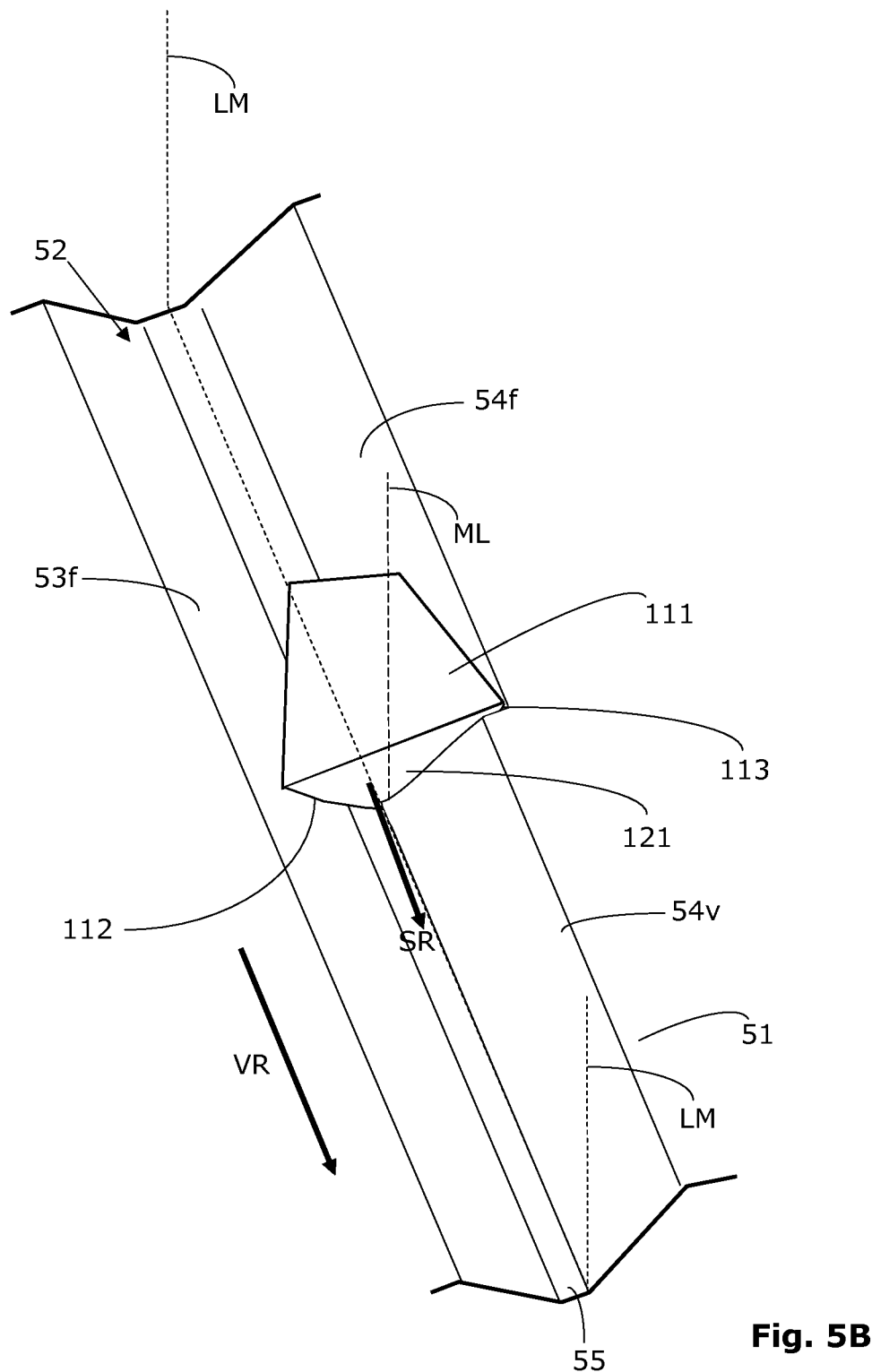
FIG. 5B shows a schematic top view illustrating the position of a cutting tooth relative to the work piece of FIG. 5A as it passes through a tooth gap during the second machining phase.

FIGS. 5A and 5B show illustrations which approximately correspond to the situation in FIGS. 3A and 3B.

FIG. 5A shows a schematic top view of a section of a work piece 50.1 and the position of a cutting tooth 111 as it passes through a tooth gap 52. The feed direction VR, the cutting direction SR, the location of the cutting tooth 111, and the schematic shape of a cutting surface 121 are shown in FIGS. 5A and 5B. The feed direction VR extends in the gap direction and is composed of the axial feed and a differential feed, which is coupled thereto, of the work piece 50.1. The cutting direction SR forms an acute angle with the feed direction VR here. FIG. 5A shows a schematic snapshot, e.g., during the first machining phase. The flank cutting edges 112, 113 and the head cutting edge 114 are shown by dashed lines in FIG. 5A, and these elements of the cutting tooth 111 are concealed by the material of the work piece 50.1. At the moment shown, both the flank cutting edges 112, 113 and also the head cutting edge 114 are used.

FIG. 5B shows a schematic snapshot, e.g., during the second machining phase. The flank cutting edge 112 is visible. Only a small section is recognizable of the flank cutting edge 113. The head cutting edge 114 is concealed in FIG. 5B by the material of the work piece 50.1. For better illustration, the auxiliary lines LM and ML are also shown in FIGS. 5A and 5B, whose significance was explained in the context of FIGS. 3A to 3D.

Figure 6:
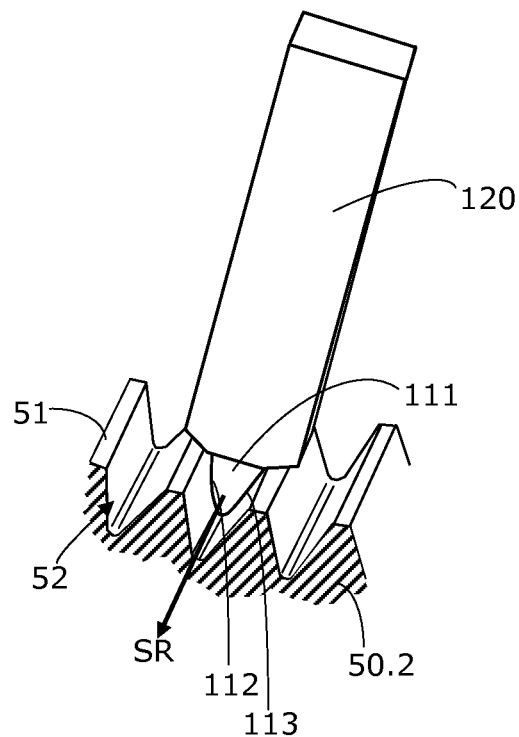
FIG. 6 shows a perspective view of a work piece during skiving, illustrating a cutter bar having a cutting tooth of a skiving tool (not shown) guided through a tooth gap of the work piece during the second machining phase.

FIG. 6 shows a section of a second work piece 50.2 during the skiving according to the invention, it being recognizable how a cutter bar 120 having cutting tooth 111 is guided through a tooth gap 52. The skiving tool 100 (called a bar cutter tool), which is shown in FIG. 6, comprises a main body for receiving multiple cutter bars 120. However, only one cutter bar 120 of the skiving tool 100 is shown here.

Each cutting tooth 111 has a cutting surface 121, which can be arranged rotationally-symmetrically on a frontal plane or on a frontal conical surface (optionally individually tilted in relation to the end plane or conical surface by a stair angle) in relation to the rotational axis R1 of the tool 100. That is, the cutting surfaces 121 in such embodiments are arranged rotationally-symmetrically in relation to the rotational axis R1 of the tool 100 on a frontal conical surface, which can degenerate to an end plane. The cutting surfaces 121 can be implemented as flat faces or as slightly curved faces on the cutting heads (cutting teeth 111). The cutting surfaces 121 can also be slightly arched in relation to a cutting face reference plane.

In some embodiments, the two rotational axes R1 and R2 are skewed to one another. The axis intersection angle Σ is thus not equal to zero here.

The tools 100 may be inclined in the direction either toward the work piece 50.1, 50.2 or away from the work piece 50.1, 50.2 during skiving. The corresponding inclination of the tool 100 is optional. It is generally used for avoiding collisions. The corresponding angle of inclination is designated by δ. In some embodiments, the angle of inclination δ is in the range from about −30° to about +30°. Details on the inclination are described, for example, in the parallel application of the present applicant, which was filed on 26 May 2011 under the application number EP11167703.5 with the European Patent Office.

Figure 7:
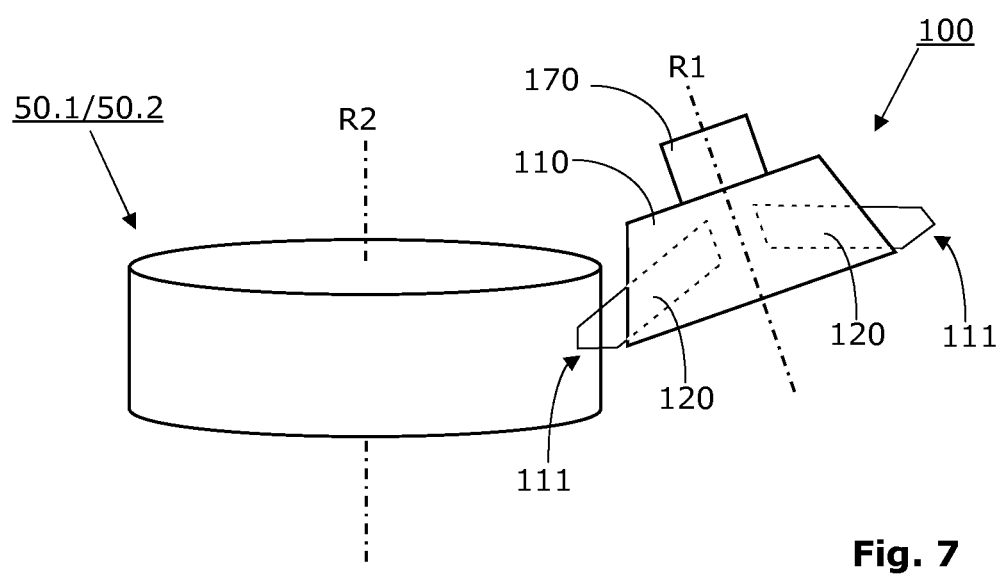
FIG. 7 shows a schematic view of an externally-toothed cylindrical work piece and a conically tapering skiving tool at an angle of inclination δ of about −20°.

FIG. 7 shows a schematic view of a conically tapering skiving tool 100, which can be used in the context of the invention at an angle of inclination δ of approximately −20°. As shown in the schematic illustration in FIG. 7, the skiving tool 100 is a so-called cutter head tool, which has a cutter head main body 110 (having the form of a truncated cone (conical form) here), which is equipped with cutter inserts, such as, for example, in the form of bar cutters 120. The skiving tool 100 is connected with respect to movement to a machine 200 by means of a tool spindle 170, which is shown schematically here. The skiving tool 100 has a collision contour (in the meaning of a three-dimensional peripheral form of cutter head main body 110 including cutter bars 120), which was selected so that a collision of the skiving tool 100 with the work piece 50.1 or 50.2 does not occur during the skiving, in spite of the inclination at approximately δ=−20°.

Figure 8:
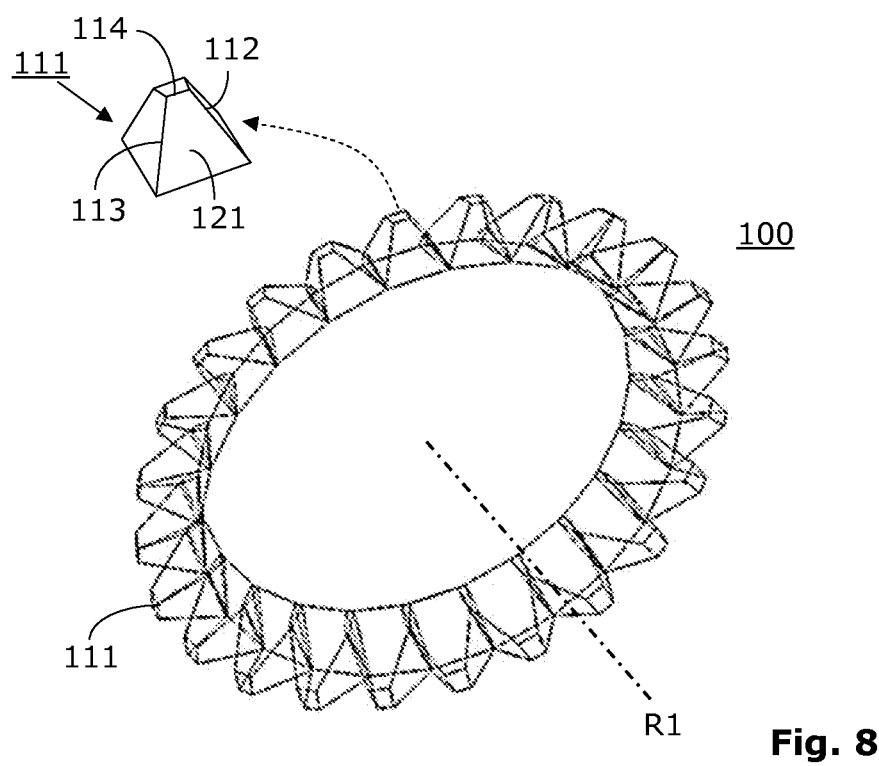
FIG. 8 shows a schematic perspective view of a skiving tool in the form of a cutting wheel complete tool.

However, the skiving tool 100 can also have another form, e.g., as indicated in FIG. 8. FIG. 8 shows a skiving tool 100, which has the form of a cutting wheel. This is a complete tool, in which the cutting teeth 111 are part of the skiving tool 100. The skiving tool 100 has 24 cutting teeth 111 here, one of which is provided with a reference sign in FIG. 8. The main body of the skiving tool 100 has the form of a truncated cone disc or a plate in the form of a truncated cone here. A single cutting tooth 111 is shown in enlarged form next to the skiving tool 100. The flank cutting edges 112, 113, the head cutting edge 114, and the cutting surface 121 are designated on this cutting tooth 111.

Figure 9A:
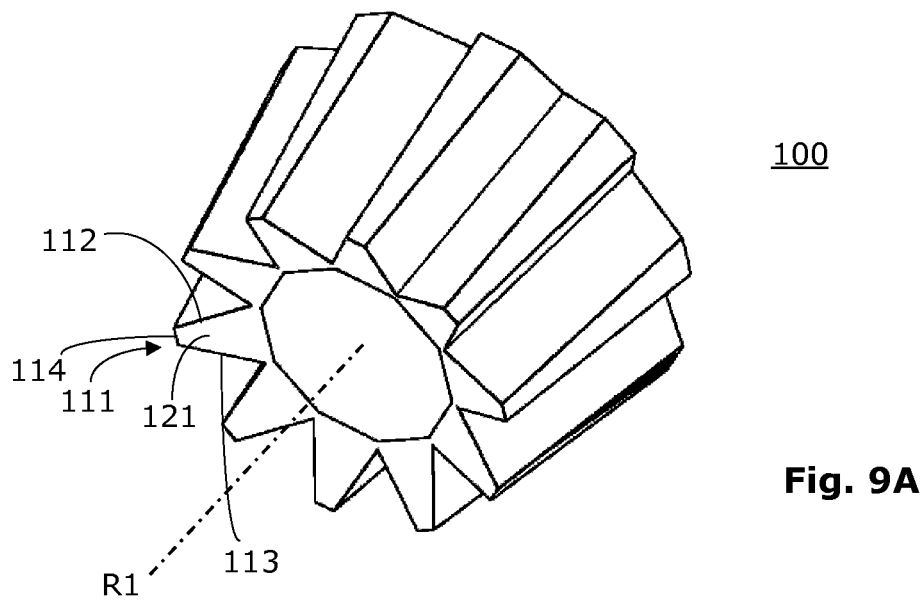
FIG. 9A shows a schematic perspective view of another embodiment of a skiving tool in the form of a cutting wheel complete tool, which is suitable for use at a positive angle of inclination δ.
Figure 9B:
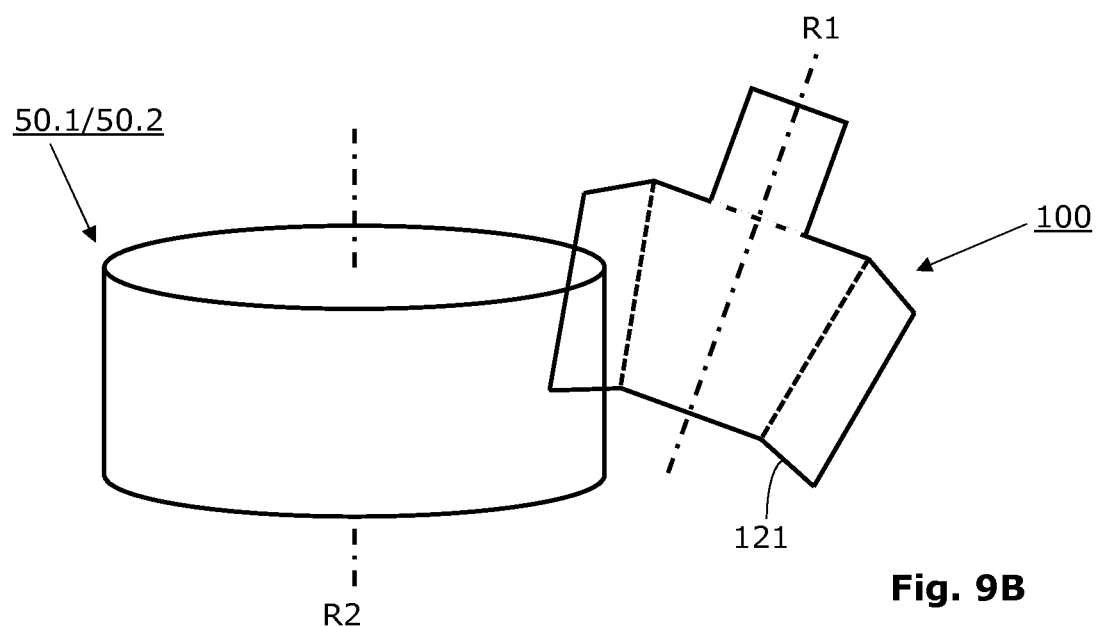
FIG. 9B shows a schematic view of an externally-toothed cylindrical work piece and the skiving tool of FIG. 9A at an angle of inclination δ of about +20°.

FIG. 9A shows a further skiving tool 100, which can be used in conjunction with the invention. The cutting surfaces 121 of the cutting teeth 111 are arranged here on a conical surface (optionally tilted). FIG. 9B shows the skiving tool 100 according to FIG. 9A in engagement with a cylindrical work piece 50.1 or 50.2. The skiving tool 100 is inclined away from the work piece 50.1, 50.2 here at a angle of inclination δ. The angle of inclination δ is approximately 20° here.

The skiving tool 100 shown in FIGS. 9A and 9B has the form of a straight-toothed bevel gear, the teeth of this bevel gear representing the cutting teeth 111. The cutting surfaces 121 are located on the end side having the smaller diameter. More precisely, the cutting surfaces 121 are arranged on the supplementary cone, i.e., on a conical surface (optionally tilted in relation thereto). The helical angle $\beta_1$ of the illustrated skiving tool 100 is 0°. Further embodiments have other helical angles $\beta_1$. For helical angles $\beta_1$ not equal to 0°, a corresponding skiving tool 100 has the basic shape of a helical-toothed bevel gear.

Figure 10A:
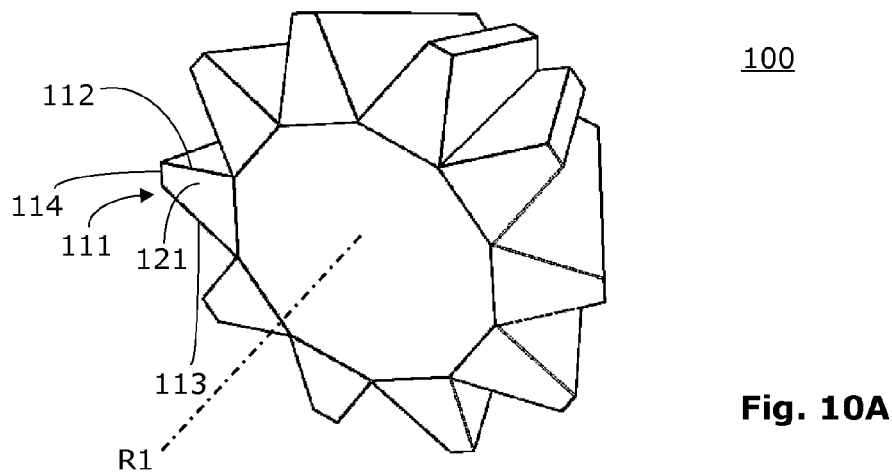
FIG. 10A shows a schematic perspective view of another embodiment of a skiving tool in the form of a cutting wheel complete tool, which is suitable for use at a negative angle of inclination δ.
Figure 10B:
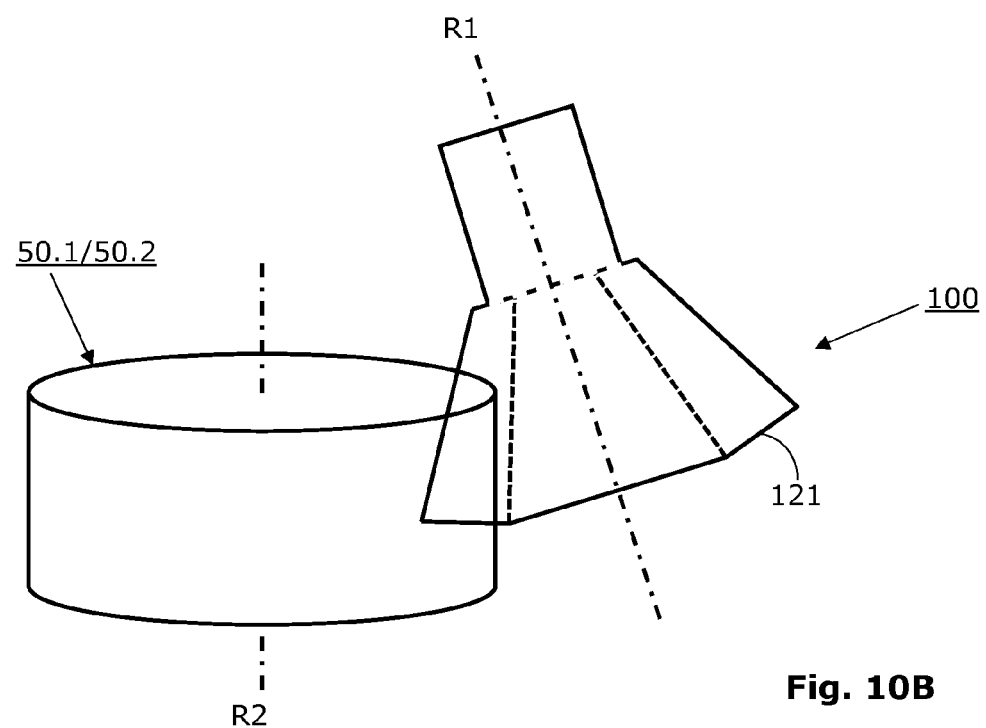
FIG. 10B shows a schematic view of an externally-toothed cylindrical work piece and the skiving tool of FIG. 10A at an angle of inclination δ of about −20°.

FIG. 10A shows a further skiving tool 100, which can be used in conjunction with the invention. The cutting surfaces 121 of the cutting teeth 111 are arranged here on a conical surface (optionally tilted). FIG. 10B shows the skiving tool 100 according to FIG. 10A in engagement with a cylindrical work piece 50.1 or 50.2. The skiving tool 100 is inclined away from the work piece 50.1, 50.2 here at a angle of inclination δ. The angle of inclination δ is approximately −18° here.

The skiving tool 100 shown in FIGS. 10A and 10B has the form of a straight-toothed bevel gear, the teeth of this bevel gear representing the cutting teeth 111. The cutting surfaces 121 are located on the end side having the larger diameter. More precisely, the cutting surfaces 121 are arranged on the supplementary cone, i.e., on a conical surface (optionally tilted in relation thereto). The helical angle $\beta_1$ of the illustrated skiving tool 100 is zero degrees. Further embodiments have other helical angles $\beta_1$. For helical angles $\beta_1$ not equal to zero degrees, a corresponding skiving tool 100 has the basic shape of a helical-toothed bevel gear.

Figure 11:
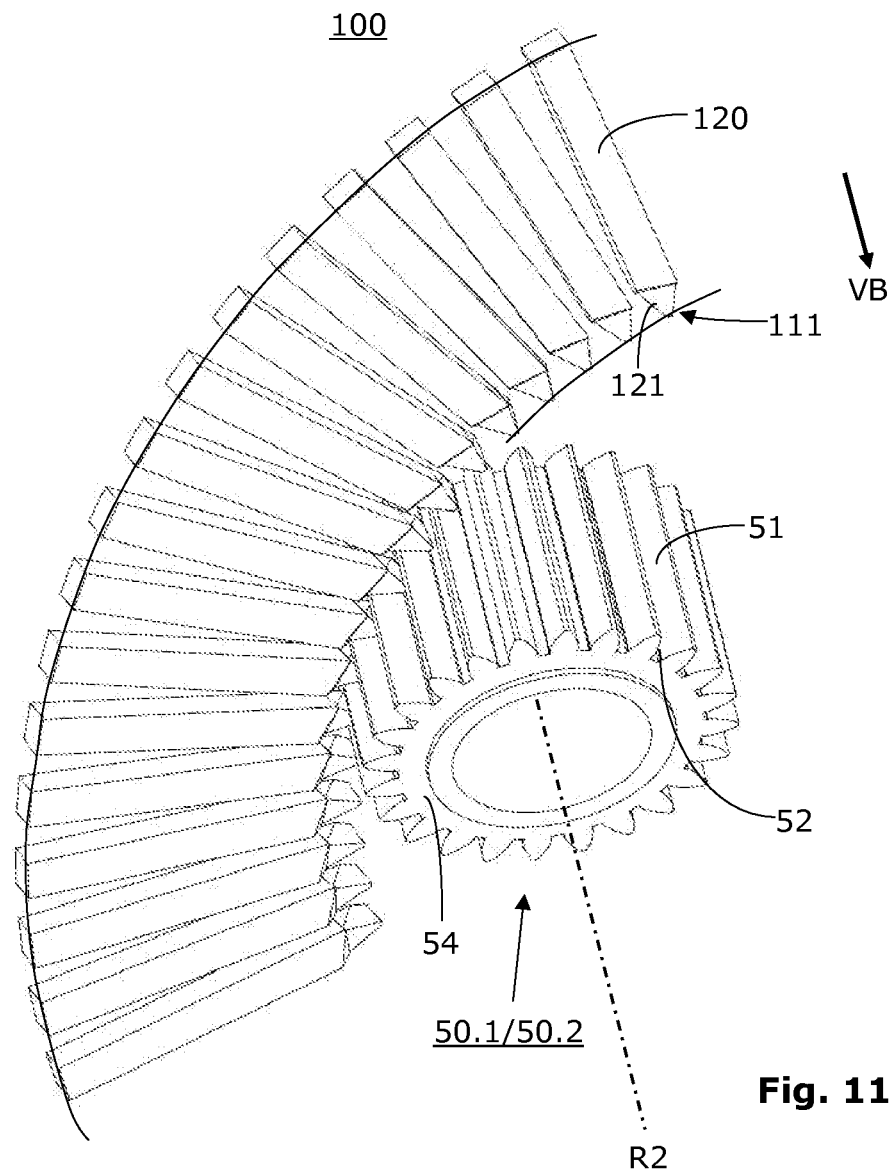
FIG. 11 shows a schematic perspective view of a portion of an inner skiving ring during the internal skiving of a straight-toothed work piece diagonally from below, where only a few cutter bars of the inner skiving ring is shown and the remaining ring-shaped main body of the inner skiving ring is not shown.

FIG. 11 shows a schematic perspective view of a part of a inner skiving ring 100 during the internal skiving of a straight-toothed work piece 50.1 or 50.2. Only a few cutter bars 120 of the inner skiving ring 100 are shown. The teeth 51, or the tooth gaps 52 between the teeth 51, respectively, have already almost been finished on the straight-toothed work piece 50.1, 50.2. The ring-shaped main body of the inner skiving ring 100 is not shown. As shown in FIG. 11, the narrow shafts (shown with rectangular cross-section here) of the cutter bars 120 can be arranged without problems or collisions in a ring-shaped main body. The cutting tooth 111 and the cutting surface 121 are designated on one of the cutter bars 120 in FIG. 11. In the example shown, the cutting surfaces 121 of the cutting teeth 111 are tilted slightly in relation to the end plane.

Details of a corresponding method for internal skiving are described, for example, in a parallel application of the present applicant, which was filed on 14 Jul. 2011 under application number EP11173901.7 with the European Patent Office.

Figure 12:
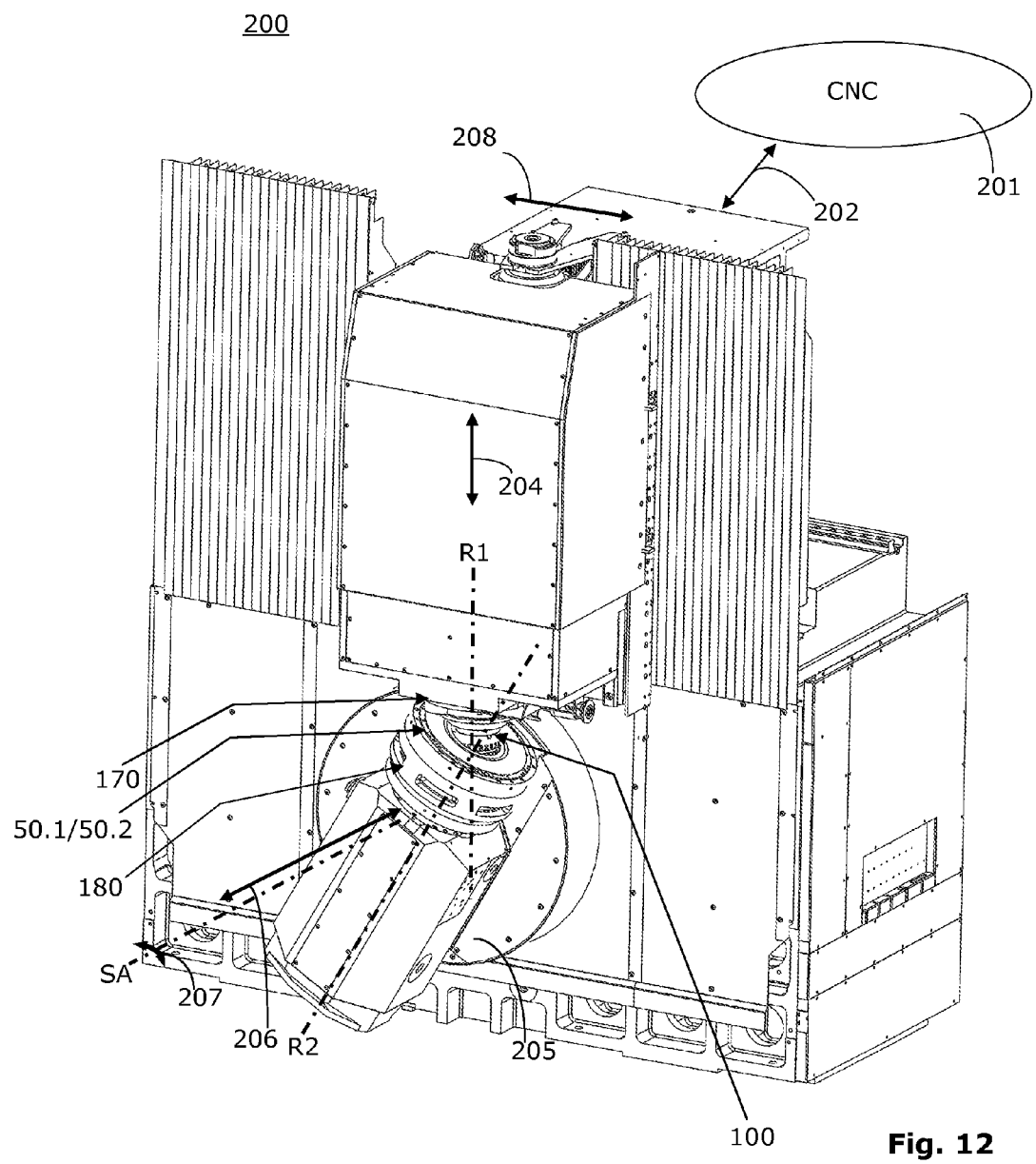
FIG. 12 shows a perspective view of a machine according to the invention having a skiving tool during gear cutting of an internally-toothed work piece.

A machine 200 is shown in FIG. 12, which is designed for the alternating semi-completing skiving according to the invention, has a CNC controller 201, which allows a coupling of the axes R1 and R2 or a coordination of the axis movements, respectively. The CNC controller 201 can be part of the machine 200, or it can be externally implemented and designed to communicate with the machine 200 via the communication connection 202. The corresponding machine 200 comprises a "electronic gear train" or an "electronic or programmed axis coupling" in order to execute a feed movement VB of the skiving tool 100 relative to the work piece 50.1 or 50.2 (the work piece 50.1 or 50.2 is an internally-toothed work piece in the example shown). The coupled movement of the skiving tool 100 and the work piece 50.1, 50.2 is implemented such that, during the various machining phases, corresponding relative movements result between the skiving tool 100 and the work piece 50.1, 50.2, which correspond to the relative movements of a helical gear drive. The electronic gear train, or the electronic or programmed axis coupling, respectively, ensure a speed synchronization of at least two axes of the machine 200. In this case, at least the rotational axis R1 of the tool spindle 170 is coupled to the rotational axis R2 of the work piece spindle 180. In addition, the rotational axis R1 of the tool spindle 170 may be coupled to the axial feed movement VB in direction R2. This axial feed movement VB results from a superposition of movements 204 (vertically) and 208 (horizontally). In addition, the work piece spindle 180 can be linearly displaced by means of a (rotary) carriage 205 parallel to a pivot axis SA, as shown by a double arrow 206. Moreover, the (rotary) carriage 205 including tool spindle 180 and work piece 50.1, 50.2 can be rotated around the pivot axis SA, as shown by a double arrow 207. The axis intersection angle Σ can be set by the rotation around the pivot axis SA. The axis spacing of the rotational axes R1 and R2 can be set by the linear displacement movement 206.

A machine 200, which is based on a vertical arrangement, as shown in FIG. 12, may be used to carry out the invention. In such a vertical arrangement, either the skiving tool 100 including tool spindle 170 is seated above the work piece 50.1, 50.2 including work piece spindle 180, or vice versa. The chips which arise from skiving fall downward because of the effect of gravity and can be removed, e.g., via a chip bed (not shown).

Furthermore, a machine 200 which is designed for the skiving according to the invention ensures the correct complex geometrical and kinematic machine settings and axis movements of the mentioned axes. The machine 200 may have six axes. Accordingly, the following axis movements are possible:

rotation of the skiving tool 100 around the first rotational axis R1;

coupled rotation of the work piece 50.1, 50.2 around second rotational axis R2;

rotational movement around the pivot axis SA;

linear vertical movement parallel to 204;

linear horizontal movement parallel to 206;

linear horizontal movement parallel to 208.

The described skiving method can be applied in dry or wet form in all embodiments.

The usage spectrum of the described skiving method is large and extends to application in the production of greatly varying rotationally-symmetric periodic structures.

As may be recognized by those of ordinary skill in the pertinent art based on the teachings herein, numerous changes and modifications may be made to the above-described and other embodiments of the present invention without departing from the scope of the invention as defined in the claims.

What is claimed is:

1. A method for skiving a first work piece and a second work piece having rotationally-symmetric, periodic structures utilizing a skiving tool, the method comprising the following steps:

moving a skiving tool into a first relative position in relation to a first work piece, executing a first skiving machining action of the first work piece, wherein one of (i) all right flanks and (ii) all left flanks of the periodic structure of the first work piece are finish machined, and the other of the all right flanks and the all left flanks are premachined, moving the skiving tool into a second relative position in relation to the first work piece, executing a second skiving machining action of the first work piece, wherein the flanks premachined during the first skiving machining action are finish machined, moving the skiving tool into a third relative position in relation to a second work piece, executing a third skiving machining action of the second work piece, wherein one of (i) all right flanks and (ii) all left flanks of the periodic structure of the second work piece that are opposite to the one of the all right flanks and all left flanks finish machined during the first skiving action, are finish machined, and the other of the all right flanks and all left flanks of the second work piece are premachined, moving the skiving tool into a fourth relative position in relation to the second work piece, and executing a fourth skiving machining action of the second work piece, wherein the flanks premachined during the third skiving machining action are finish machined.

2. A method according to claim 1, wherein the first and second skiving machining actions of the first work piece comprise the following steps:

rotating the skiving tool about a first rotational axis, coupledly rotating the first work piece about a second rotational axis, and executing an axial feed movement of the skiving tool relative to the first work piece in a direction parallel to the second rotational axis.

3. A method according to claim 1, wherein the third and fourth skiving machining actions of the second work piece comprise the following steps:

rotating the skiving tool around a first rotational axis, coupledly rotating the second work piece around a second rotational axis, and executing an axial feed movement of the skiving tool relative to the second work piece in a direction parallel to the second rotational axis.

4. A method according to claim 1, wherein the skiving tool comprises multiple cutting teeth, each comprising a first flank cutting edge for cutting right flanks of a work piece, a second flank cutting edge for cutting left flanks of a work piece, and a head cutting edge, which lies in a transition region between the first flank cutting edge and the second flank cutting edge.

5. A method according to claim 4, including performing the skiving machining actions wherein the total number of cuts executed with the first flank cutting edges during the skiving machining actions of the first work piece and the second work piece are approximately equal to the total number of cuts executed with the second flank cutting edges during the skiving machining actions of the first work piece and the second work piece.

6. A method according to claim 4, wherein the first and second work pieces define gaps to be finished, and the head cutting edges define widths that are smaller than a respective width at a base of the gaps.

7. A method according to claim 6, wherein the widths of the head cutting edges define widths that are less than or equal to approximately ⅔ of the respective width at the base of the gaps.

8. A method according to claim 1, wherein at least two of the first, second, third and fourth relative positions differ from one another with respect to an angle of rotation of the first work piece or the second work piece relative thereto.

9. A method according to claim 1, wherein the second relative position of the skiving tool with respect to the first work piece corresponds to the third relative position of the skiving tool with respect to the second work piece and the first relative position of the skiving tool with respect to the first work piece corresponds to the fourth relative position of the skiving tool with respect to the second work piece.

10. A method accord to claim 1, including executing the skiving machining actions on soft or unhardened work pieces.

11. A machine having a CNC controller, programmed and adapted to execute the following steps:

moving a skiving tool into a first relative position in relation to a first work piece, executing a first skiving machining action of the first work piece, wherein one of (i) all right flanks and (ii) all left flanks of the periodic structure of the first work piece are finish machined, and the other of the all right flanks and the all left flanks are premachined, moving the skiving tool into a second relative position in relation to the first work piece, executing a second skiving machining action of the first work piece, wherein the flanks premachined during the first skiving machining action are finish machined, moving the skiving tool into a third relative position in relation to a second work piece, executing a third skiving machining action of the second work piece, wherein one of (i) all right flanks and (ii) all left flanks of the periodic structure of the second work piece that are opposite to the one of the all right flanks and all left flanks finish machined during the first skiving action, are finish machined, and the other of the all right flanks and all left flanks of the second work piece are premachined, moving the skiving tool into a fourth relative position in relation to the second work piece, and executing a fourth skiving machining action of the second work piece, wherein the flanks premachined during the third skiving machining action are finish machined.

12. A machine according to claim 11, further comprising a software module programmed and adapted to execute predefined alternating semi-completing skiving to effect substantially uniform cutting load of cutting edges of the skiving tool.

* * * * *